(12) United States Patent
Arihara et al.

(10) Patent No.: US 11,079,667 B2
(45) Date of Patent: Aug. 3, 2021

(54) PROJECTION TYPE IMAGE DISPLAY DEVICE

(71) Applicant: JVCKENWOOD Corporation, Yokohama (JP)

(72) Inventors: Yasuki Arihara, Yokohama (JP); Takatsugu Aizaki, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 41 days.

(21) Appl. No.: 16/511,302

(22) Filed: Jul. 15, 2019

(65) Prior Publication Data

US 2020/0073222 A1 Mar. 5, 2020

(30) Foreign Application Priority Data

Aug. 29, 2018 (JP) .............................. JP2018-160324

(51) Int. Cl.
*H04N 9/31* (2006.01)
*G03B 21/20* (2006.01)
*H04N 13/307* (2018.01)

(52) U.S. Cl.
CPC ..... *G03B 21/2073* (2013.01); *G03B 21/2066* (2013.01); *H04N 9/31* (2013.01);
(Continued)

(58) Field of Classification Search
CPC .. G02F 1/133526; H04N 9/3105; H04N 9/31; H04N 9/3167; H04N 13/307; G03B 21/2073
(Continued)

(56) References Cited

U.S. PATENT DOCUMENTS 6,204,972 B1 3/2001 Itoh
6,257,726 B1 7/2001 Okuyama
(Continued)

FOREIGN PATENT DOCUMENTS

EP 1 031 870 A2 8/2000
JP 2002-023108 A 1/2002
(Continued)

OTHER PUBLICATIONS

Search Report dated Feb. 1, 2020 issued in corresponding European Application No. 19194131.9.

*Primary Examiner* — Christopher M Raabe
(74) *Attorney, Agent, or Firm* — Nath, Goldberg & Meyer; Jerald L. Meyer

(57) ABSTRACT

A step difference exists at a boundary between lens cells in a first direction of a fly-eye lens, whereas a step difference does not exist at a boundary between lens cells in a second direction. Central light transmitted though a central portion of the lens cell in the first direction is incident on a polarized light separation surface of a polarized light conversion element, and the polarized light separation surface reflects a first polarized light included in the central light and transmits a second polarized light. A reflection surface reflects the reflected first polarized light and causes the polarized light conversion element to emit the reflected first polarized light, and a ½ wavelength plate converts the second polarized light transmitted through the polarized light separation surface into the first polarized light and causes the polarized light conversion element to emit the converted first polarized light.

2 Claims, 5 Drawing Sheets

(52) U.S. Cl.
CPC ......... *H04N 9/3105* (2013.01); *H04N 9/3167* (2013.01); *H04N 13/307* (2018.05)

(58) Field of Classification Search
USPC .......................................................... 362/19
See application file for complete search history.

(56) References Cited

U.S. PATENT DOCUMENTS

| | | |
|---|---|---|
| 6,273,569 B1 | 8/2001 | Iechika et al. |
| 6,513,953 B1 * | 2/2003 | Itoh ..................... G02B 3/0062 |
| | | 348/E9.027 |
| 6,527,393 B1 | 3/2003 | Ogawa |
| 6,542,298 B1 | 4/2003 | Aoki |
| 6,552,760 B1 | 4/2003 | Gotoh et al. |
| 2003/0197937 A1 | 10/2003 | Ogawa et al. |

FOREIGN PATENT DOCUMENTS

| | | |
|---|---|---|
| JP | 2003-337378 A | 11/2003 |
| JP | 2007-078731 A | 3/2007 |

* cited by examiner

PROJECTION TYPE IMAGE DISPLAY DEVICE

CROSS REFERENCE TO RELATED APPLICATION

This application is based upon and claims the benefit of priority under 35 U.S.C. § 119 from Japanese Patent Application No. 2018-160324 filed on Aug. 29, 2018, the entire contents of which are incorporated herein by reference.

BACKGROUND

The present disclosure relates to a projection type image display device including a pair of fly-eye lenses.

A projection type image display device may include a pair of fly-eye lenses in an illumination optical system. Each fly-eye lens includes a plurality of rectangular lens cells. In order to improve the performance of the illumination optical system, each lens cell provided in the fly-eye lens is often eccentric.

SUMMARY

A degree of eccentricity of each lens cell of a fly-eye lens varies depending on the position of the lens cell provided in the fly-eye lens, such that there exists a step difference at the boundary between two lens cells adjacent to each other (refer to Japanese Unexamined Patent Application Publication No. 2002-23108 or Japanese Unexamined Patent Application Publication No. 2007-78731). When the fly-eye lens including the step difference at the boundary therebetween is manufactured, a shape error which is different from the design shape called "sagging" or "chipping" occurs at the end portion of each lens cell. This kind of shape error adversely affects the quality of an image to be projected.

Therefore, it is conceivable to design and manufacture the fly-eye lens so as to eliminate the step difference at the boundary between the lens cells. However, when the shape of the fly-eye lens is corrected to eliminate the step difference at the boundary therebetween, a size of an illumination range by each lens cell is changed, and thus the brightness of light emitted from each lens cell and superimposed on each other becomes uneven in a plane.

An aspect of one or more embodiments provides a projection type image display device, including: a first fly-eye lens configured to include a plurality of first lens cells arranged in a first direction and a second direction orthogonal to the first direction, and to divide an incident luminous flux into partial luminous fluxes for the respective first lens cells; a second fly-eye lens configured to include a plurality of second lens cells arranged in the first direction and the second direction, and to individually condense the respective partial luminous fluxes emitted from the respective first lens cells by the respective second lens cells; and polarized light conversion element configured to emit a first polarized light used as illumination light, and to convert a second polarized light not used as the illumination light into the first polarized light to emit the converted first polarized light, out of the first polarized light and the second polarized light included in the light incident from the second fly-eye lens.

In the polarized light conversion element, a reflection surface including a predetermined angle with respect to an incident surface of the light incident from the second fly-eye lens and reflecting the incident light and a polarized light separation surface including the predetermined angle, reflecting the first polarized light included in the incident light, and transmitting the second polarized light are alternately formed in the first direction at an interval of ½ of a size of the second lens cell in the first direction.

A region sandwiched between the reflection surface and the polarized light separation surface on a light emission surface of the polarized light conversion element is alternately formed with a polarized light conversion region to which a ½ wavelength plate is stuck and a non-polarized light conversion region to which the ½ wavelength plate is not stuck in the first direction.

The ½ wavelength plate is opposite to the plurality of the second lens cells arranged in the second direction, the plurality of the second lens cells are respectively eccentric in the first and second directions.

End portions of two second lens cells at a first boundary between the two second lens cells adjacent to each other in the first direction are deviated in the thickness direction of the second fly-eye lens, such that a step difference exists at the first boundary.

End portions of two second lens cells at a second boundary between the two second lens cells adjacent to each other in the second direction coincide with each other in the thickness direction of the second fly-eye lens, such that a step difference does not exist at the second boundary.

Central light transmitted through a central portion of the second lens cell in the first direction is incident on the polarized light separation surface, and the polarized light separation surface reflects the first polarized light included in the central light and transmits the second polarized light.

The reflection surface on which the first polarized light reflected by the polarized light separation surface is incident reflects the first polarized light and causes the polarized light conversion element to emit the reflected first polarized light, and the ½ wavelength plate on which the second polarized light transmitted through the polarized light separation surface is incident converts the second polarized light into the first polarized light and causes the polarized light conversion element to emit the converted first polarized light.

Peripheral light transmitted through a peripheral portion near the first boundary between the second lens cells is incident on the reflection surface and the reflection surface reflects the peripheral light, and the polarized light separation surface on which the peripheral light reflected by the reflection surface is incident reflects the first polarized light included in the peripheral light and transmits the second polarized light.

The ½ wavelength plate on which the first polarized light reflected by the polarized light separation surface is incident converts the first polarized light into the second polarized light and causes the polarized light conversion element to emit the converted second polarized light, and the other reflection surface on which the second polarized light transmitted through the polarized light separation surface is incident reflects the second polarized light and causes the polarized light conversion element to emit the reflected second polarized light.

DETAILED DESCRIPTION

Hereinafter, a projection type image display device according to one or more embodiments will be described with reference to the accompanying drawings. First, an overall configuration and operation of a projection type image display device 100 which is a configuration example of the projection type image display device according to one or more embodiments will be described with reference to FIG. 1.

Figure 1:
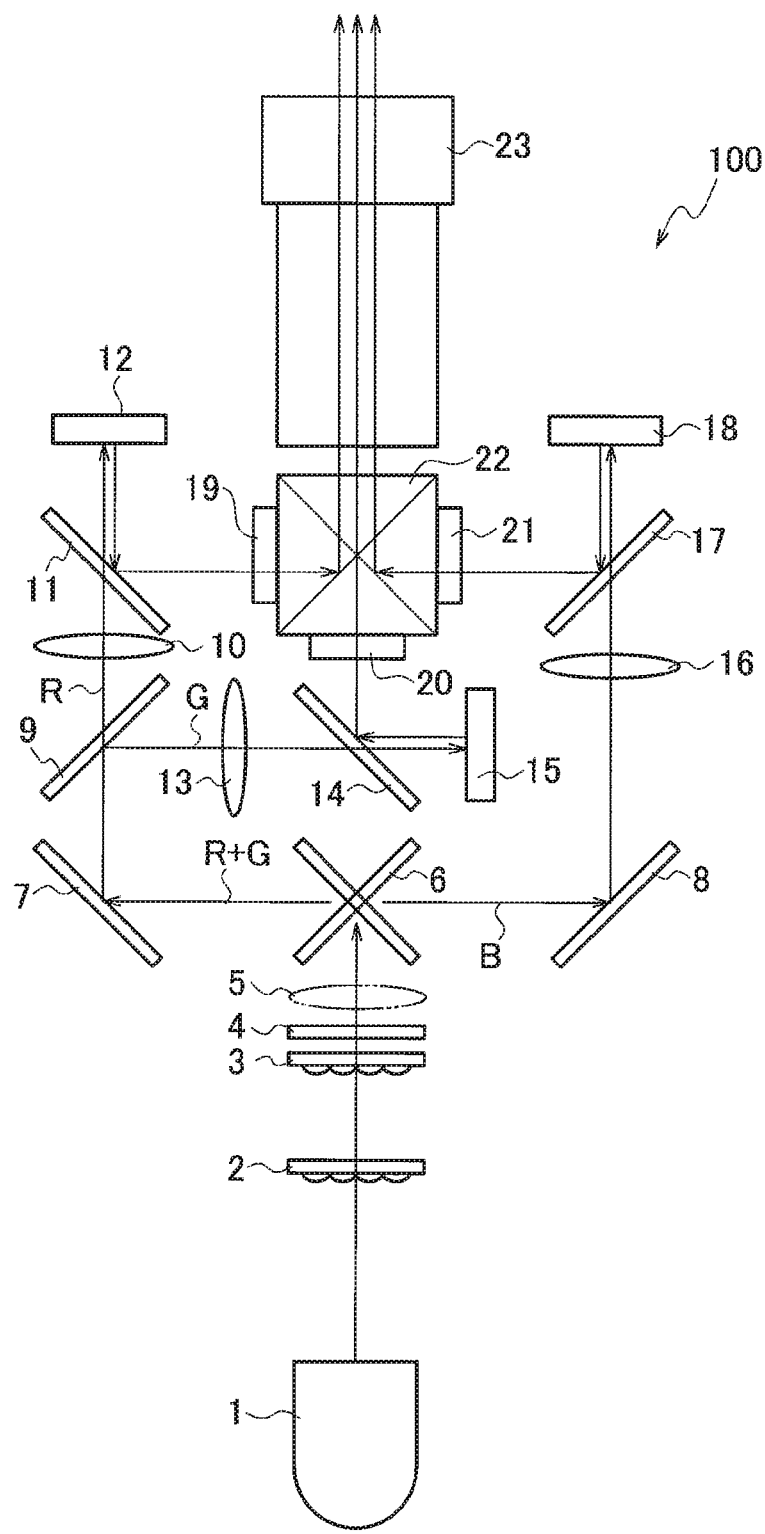
FIG. 1 is a view illustrating an overall configuration example of a projection type image display device according to one or more embodiments.

In FIG. 1, a light source 1 emits white light. As an example, the light source 1 is an ultra-high-pressure mercury lamp. The white light is an indefinite polarized light including P-polarized light and S-polarized light. A type of the light source 1 is not limited, and a light emitting diode (LED) or a laser diode may be used as the light source 1. Depending on the type of the light source 1, the light source 1 may emit light of a color other than white.

The white light is irradiated on a first fly-eye lens 2. The first fly-eye lens 2 has a structure in which a plurality of rectangular lens cells are arranged in a matrix shape in a first direction and in a second direction orthogonal to the first direction in a plane. The first and second directions respectively correspond to a horizontal direction (X direction) and a vertical direction (Y direction) of an image to be projected by the projection type image display device 100. The first fly-eye lens 2 divides the luminous flux of the irradiated white light into partial luminous fluxes for each lens cell.

Each partial luminous flux emitted from the first fly-eye lens 2 is irradiated on a second fly-eye lens 3. In the same manner as that of the first fly-eye lens 2, the second fly-eye lens 3 has a structure in which a plurality of rectangular lens cells are arranged in a matrix shape in the X direction and Y direction in a plane. Each lens cell of the second fly-eye lens 3 corresponds to each lens cell of the first fly-eye lens 2 by one to one. Each lens cell of the second fly-eye lens 3 individually condenses each partial luminous flux emitted from each lens cell of the first fly-eye lens 2.

Each lens cell is eccentric such that the partial luminous fluxes emitted from the respective lens cells of the second fly-eye lens 3 are condensed and the respective partial luminous fluxes are superimposed on each other. A degree of eccentricity of each lens cell of the second fly-eye lens 3 varies depending on a position of the lens cell. The second fly-eye lens 3 is configured in such a manner that, in the X direction and the Y direction, a step difference exists at a boundary between the lens cells adjacent to each other in one direction and a step difference does not exist at a boundary between the lens cells adjacent to each other in the other direction.

In FIG. 1, the number of lens cells of the first fly-eye lens 2 and the second fly-eye lens 3 is reduced to simplify the drawing. The number and shape of the lens cells of the first fly-eye lens 2 and the second fly-eye lens 3 will be described in detail later.

The partial luminous flux emitted from each lens cell of the second fly-eye lens 3 is irradiated on a polarized light conversion element 4. In order to use the first polarized light that is one of the P-polarized light and S-polarized light included in each partial luminous flux as illumination light, the polarized light conversion element 4 converts the second polarized light that is the other of the P-polarized light and S-polarized light and is not used illumination light into the first polarized light. For example, in one or more embodiments, the first polarized light is the S-polarized light and the second polarized light is the P-polarized light.

The polarized light conversion element 4 mainly emits the S-polarized light by converting the P-polarized light into the S-polarized light, but may emit the P-polarized light by converting the S-polarized light into the P-polarized light.

A specific configuration and action of the polarized light conversion element 4 will be described later. In one or more embodiments, the S-polarized light as polarized light at the time of being irradiated on the second fly-eye lens 3 is used as the illumination light, but the P-polarized light may be configured to be used as the illumination light.

The light mainly formed of the S-polarized light emitted from the polarized light conversion element 4 is incident on a cross dichroic mirror 6, in a state where the light is condensed by a condensing action performed by the second fly-eye lens 3 and the respective partial luminous fluxes are superimposed on each other. If each lens cell of the second fly-eye lens 3 is not eccentric and each lens cell does not perform the condensing action, a condenser lens 5 as indicated by a two-dash chain line is required in a rear stage of the polarized light conversion element 4. The condenser lens 5 can be configured to be omitted by causing each lens cell of the second fly-eye lens 3 to be eccentric.

The cross dichroic mirror 6 separates the incident light into red light (hereinafter referred to as R light), green light (hereinafter referred to as G light), and blue light (hereinafter referred to as B light). The R light and the G light are reflected by a reflection mirror 7 such that a traveling direction of the R light and the G light is bent by 90 degrees, after which the R light and the G light is directed to a dichroic mirror 9. The B light is reflected by a reflection mirror 8 such that a traveling direction of the B light is bent by 90 degrees, after which the B light is directed to a field lens 16.

The R light out of the R light and the G light is transmitted through the dichroic mirror 9 and is directed to a field lens 10. The G light is reflected by the dichroic mirror 9 such that the traveling direction of the G light is bent by 90 degrees, after which the G light is directed to a field lens 13. The field lenses 10, 13, and 16 are lenses for aligning the traveling direction of light at the peripheral portion of the field of view.

The R light transmitted through the field lens 10 is transmitted through a polarizing plate 11 and is incident on a red image display element 12. As an example, the polarizing plate 11, and polarizing plates 14 and 17 which will be described later are wire grid polarizing plates. As an example, the red image display element 12, and a green image display element 15 and a blue image display element 18 which will be described later are reflection type liquid crystal display elements. Typically, the reflection type liquid crystal display element is a spatial light modulation element referred to as LCOS (Liquid Crystal On Silicon).

The red image display element 12 modulates and reflects the R light according to a red component of an image to be projected. The red image display element 12 modulates the R light, thereby converting the S-polarized light into the P-polarized light. Accordingly, the modulated light of the R light reflected by the red image display element 12 is reflected by the polarizing plate 11 such that the traveling direction of the modulated light of the R light is bent by 90 degrees, after which the modulated light thereof is directed to a polarizing plate 19 stuck to a color combining prism 22.

The G light is transmitted through the field lens 13 and the polarizing plate 14, and then is incident on the green image display element 15. The green image display element 15 modulates and reflects the G light according to a green component of the image to be projected. The green image display element 15 modulates the G light, thereby converting the S-polarized light into the P-polarized light. Accordingly, the modulated light of the G light reflected by the green image display element 15 is reflected by the polarizing plate 14 such that the traveling direction of the modulated light of the G light is bent by 90 degrees, after which the modulated light thereof is directed to a polarizing plate 20 stuck to the color combining prism 22.

The B light is transmitted through the field lens 16 and the polarizing plate 17, and then is incident on the blue image display element 18. The blue image display element 18 modulates and reflects the B light according to a blue component of the image to be projected. The blue image display element 18 modulates the B light, thereby converting the S-polarized light into the P-polarized light. Accordingly, the modulated light of the B light reflected by the blue image display element 18 is reflected by the polarizing plate 17 such that the traveling direction of the modulated light of the B light is bent by 90 degrees, after which the modulated light thereof is directed to a polarizing plate 21 stuck to the color combining prism 22. As an example, the polarizing plates 19, 20, and 21 are wire grid polarizing plates.

The polarizing plates 19, 20, and 21 remove the unnecessary S-polarized light included in the respective incident R light, G light, and B light. Therefore, only the necessary P-polarized fight is incident on the color combining prism 22. The color combining prism 22 performs the color combination of the R light, the G light, and the B light, and then emits the combined light toward a projection lens 23. The projection lens 23 enlarges and projects the combined light on an unillustrated screen. As described above, the projection type image display device 100 displays the image on the screen.

Figure 2:
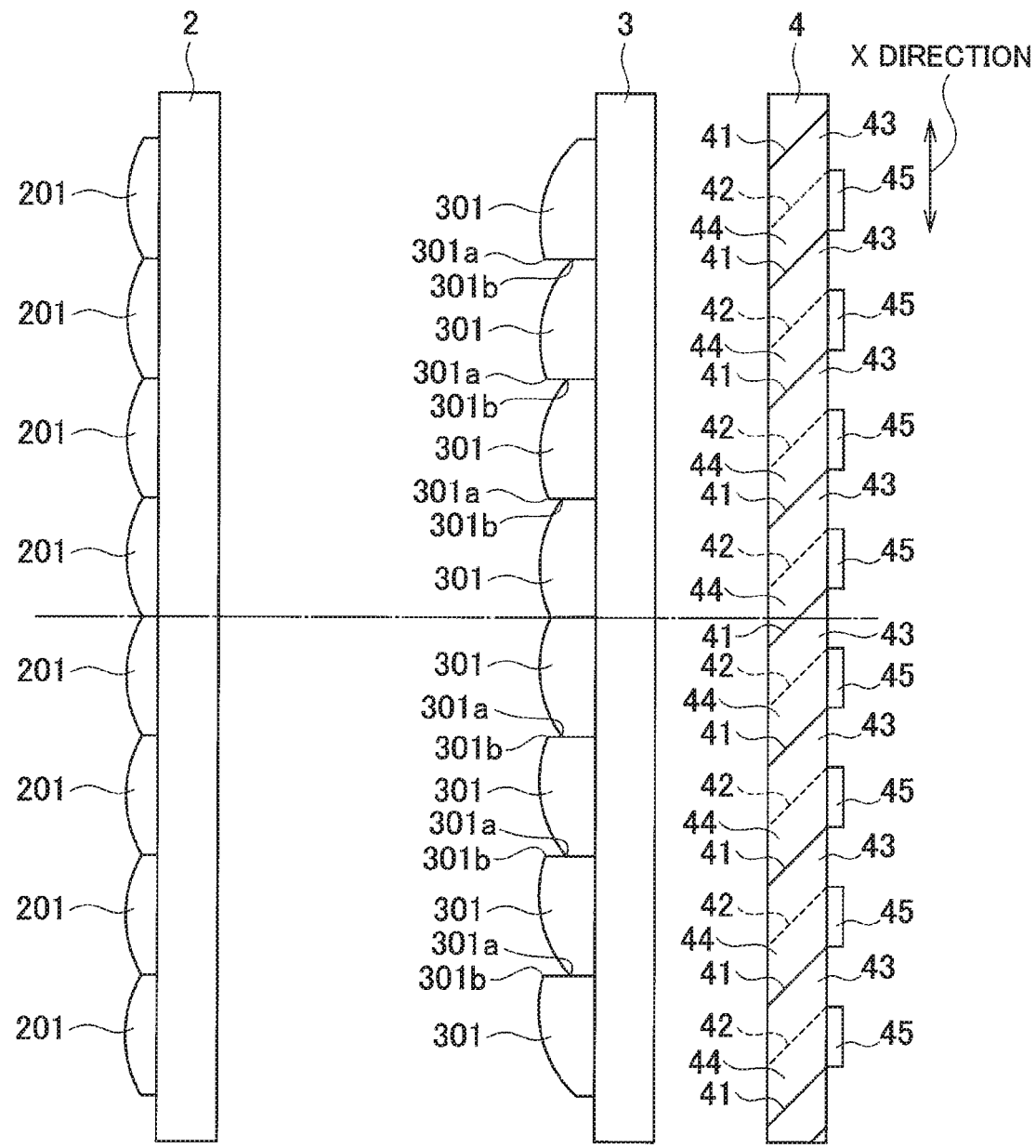
FIG. 2 is a side view of a first fly-eye lens, a second fly-eye lens, and a polarized light conversion element when viewed from the side.

Structures of the first fly-eye lens 2, the second fly-eye lens 3, the polarized light conversion element 4, and the relationship between the second fly-eye lens 3 and the polarized light conversion element 4 will be described with reference to FIGS. 2 and 3. FIG. 2 illustrates a state in which the first fly-eye lens 2, the second fly-eye lens 3, and the polarized light conversion element 4 are viewed from the side. In one or more embodiments, light emitted from each lens cell of the second fly-eye lens 3 and superimposed on each other is configured to be rotated by 90 degrees and to be projected on the screen. Accordingly, a height direction of when the first fly-eye lens 2, the second fly-eye lens 3, and the polarized light conversion element 4 are viewed from the side is the X direction.

As illustrated in FIG. 2, for example, 8 pieces of lens cells 201 (first lens cells) are arranged in the X direction in the first fly-eye lens 2. The lens cell 201 is a convex lens and is not eccentric. The 8 pieces of lens cells 201 have the same height. In the second fly-eye lens 3, 8 pieces of lens cells 301 (second lens cells) are arranged in the X direction so as to correspond to the respective lens cells 201. The lens cell 301 is a convex lens and is eccentric in the X direction.

More specifically, the lens cell 301 positioned above the center in the X direction indicated by a one-dash chain line is eccentric downward, and the lens cell 301 positioned below the center is eccentric upward. That is, the lens cell 301 positioned thereabove and the lens cell 301 positioned therebelow are mutually eccentric to the center side in the X direction. A degree of eccentricity of the lens cell 301 becomes large as the lens cell 301 goes from the center toward an upper end portion or a lower end portion. 8 pieces of lens cells 301 have the same height.

The lower end portion of the surface of each lens cell 301 of the plurality of lens cells 301 arranged in the X direction is defined as 301*a* and the upper end portion thereof is defined as 301*b*. The end portion 301*a* and the end portion 301*b* of two lens cells 301 adjacent to each other in the X direction do not coincide with each other and are deviated in the thickness direction of the second fly-eye lens 3. That is, a step difference exists at a boundary between two lens cells 301 adjacent to each other. Note that there is no step difference at a boundary between two lens cells 301 sandwiching the center in the X direction indicated by the one-dash chain line.

Figure 3:
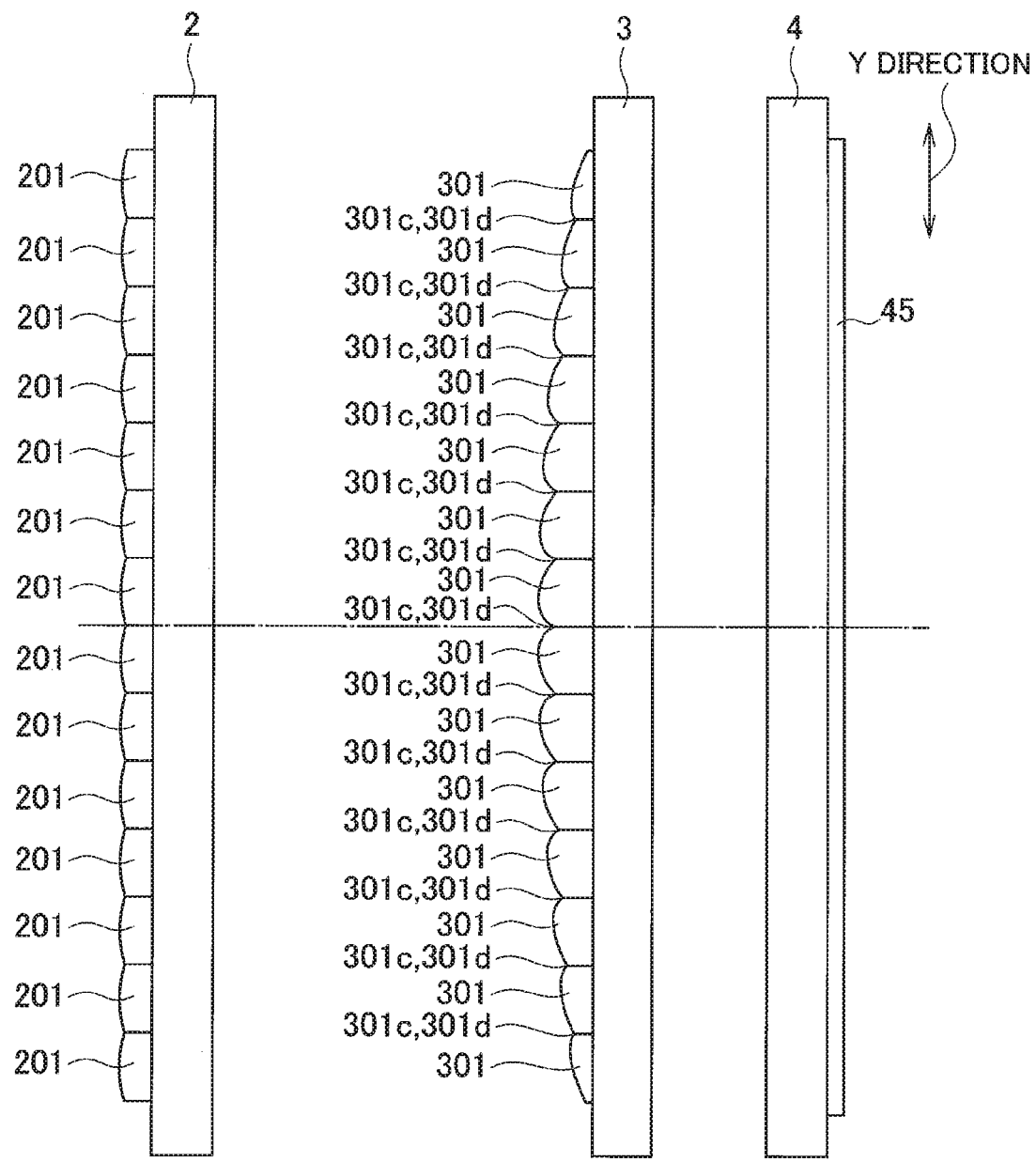
FIG. 3 is a top view of the first fly-eye lens 2, the second fly-eye lens, and the polarized light conversion element when viewed from the top.

FIG. 3 illustrates a state in which the first fly-eye lens 2, the second fly-eye lens 3, and the polarized light conversion element 4 are viewed from the top. A width direction of when the first fly-eye lens 2, the second fly-eye lens 3, and the polarized light conversion element 4 are viewed from the top is the Y direction.

As illustrated in FIG. 3, for example, 14 pieces of lens cells 201 are arranged in the Y direction of the first fly-eye lens 2. In the second lens 3, 14 pieces of lens cells 301 are arranged in the Y direction so as to correspond to the respective lens cells 201. The lens cell 301 is eccentric in the Y direction.

More specifically, the lens cell 301 positioned on one side (upper portion of FIG. 3) with respect to the center in the Y direction indicated by a one-dash chain line is eccentric to the other side (lower portion of FIG. 3), and the lens cell 301 positioned on the other side (lower portion of FIG. 3) with respect to the center is eccentric to one side (upper portion of FIG. 3). That is, the lens cell 301 positioned on one side and the lens cell 301 positioned on the other side are mutually eccentric to the center side in the Y direction. A degree of eccentricity of the lens cell 301 becomes large as the lens cell 301 goes from the center to the end portion in the Y direction. Heights of the 14 pieces of lens cells 301 increase in order from the end portion in the Y direction to the center.

The lower end portion of FIG. 3 of the surface of each lens cell 301 of the plurality of lens cells 301 arranged in the Y direction is defined as 301*c* and the upper end portion thereof is defined as 301*d*. The end portion 301*c* and the end portion 301*d* of two lens cells 301 adjacent to each other in the Y direction coincide with each other and are not deviated in the thickness direction of the second fly-eye lens 3. That is, in the Y direction, there is no step difference at a boundary between two lens cells 301 adjacent to each other.

Returning to FIG. 2, a reflection surface 41 indicated by a solid line and a polarized light separation surface 42 indicated by a broken line are alternately formed in the X direction on the inside of the polarized light conversion element 4. The reflection surface 41 and the polarized light separation surface 42 are formed so as to have a predetermined angle with respect to an incident surface of light of the polarized light conversion element 4. The predetermined angle is desirably 45 degrees. In one or more embodiments, the reflection surface 41 reflects the incident light, and the polarized light separation surface 42 transmits the P-polarized light and reflects the S-polarized light.

Regions sandwiched between the reflection surface 41 and the polarized light separation surface 42 are defined as regions 43 and 44. The distance between the region 43 and the region 44 in the X direction is the same. The size of each lens cell 301 in the X direction is the same as the distance in the X direction obtained by combining the regions 43 and 44. A ½ wavelength plate 45 is stuck to a portion of each region 44 on a light emission surface of the polarized light conversion element 4. The distance in the X direction of the ½ wavelength plate 45 is ½ of the size of the lens cell 301 in the X direction.

The ½ wavelength plate 45 is stuck to the portion of each region 44 on the light emission surface of the polarized light conversion element 4, and the region 44 is referred to as the polarized light conversion region 44. The ½ wavelength plate 45 is not stuck to a portion of each region 43 on the light emission surface of the polarized light conversion element 4, and the region 43 is referred to as the non-polarized light conversion region 43. The non-polarized light conversion region 43 and the polarized light conversion region 44 are alternately formed in the X direction at an interval of ½ of the size of the lens cell 301 in the X direction in the polarized light conversion element 4.

Figure 4:
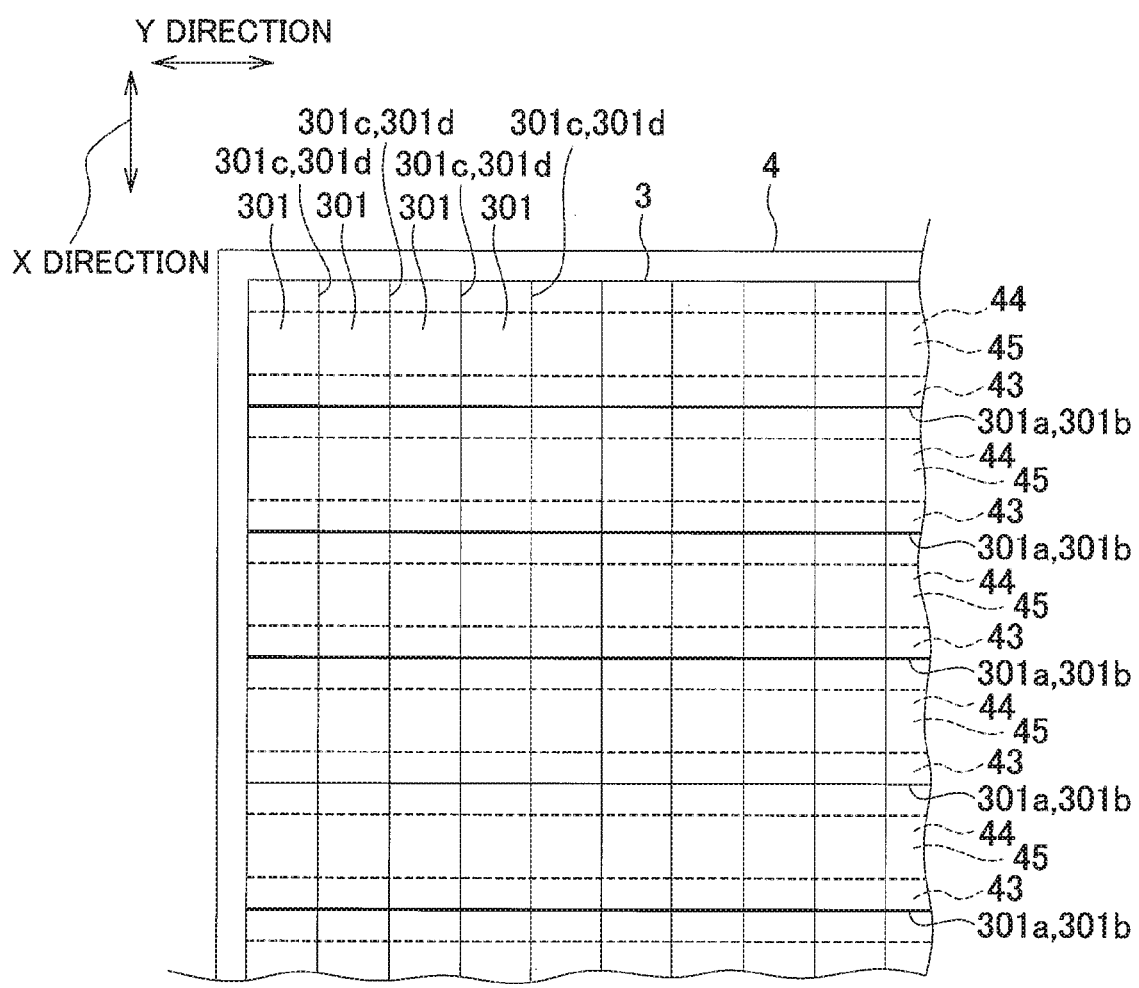
FIG. 4 is a plan view illustrating a state where the second fly-eye lens and the polarized light conversion element are viewed from the side of the second fly-eye lens.

FIG. 4 illustrates a state in which the second fly-eye lens 3 and the polarized light conversion element 4 are viewed from the side of the second fly-eye lens 3. The positions of the non-polarized light conversion region 43 of the polarized light conversion element 4 and the polarized light conversion region 44 thereof in FIG. 4 indicate the positions on the light emission surface of the polarized light conversion element 4. The ½ wavelength plate 45 is opposite to the plurality of lens cells 301 arranged in the Y direction.

In FIG. 4, the end portions 301a and 301b forming the boundary between two lens cells 301 adjacent to each other in the X direction have the step difference, and a state of the step difference is indicated by a thick solid line. The step difference of the boundary indicated by the thick solid line is opposite to the non-polarized light conversion region 43 to which the ½ wavelength plate 45 is not stuck. On the other hand, the end portions 301c and 301d forming the boundary between two lens cells 301 adjacent to each other in the Y direction do not have the step difference, and intersect the ½ wavelength late 45.

Figure 5:
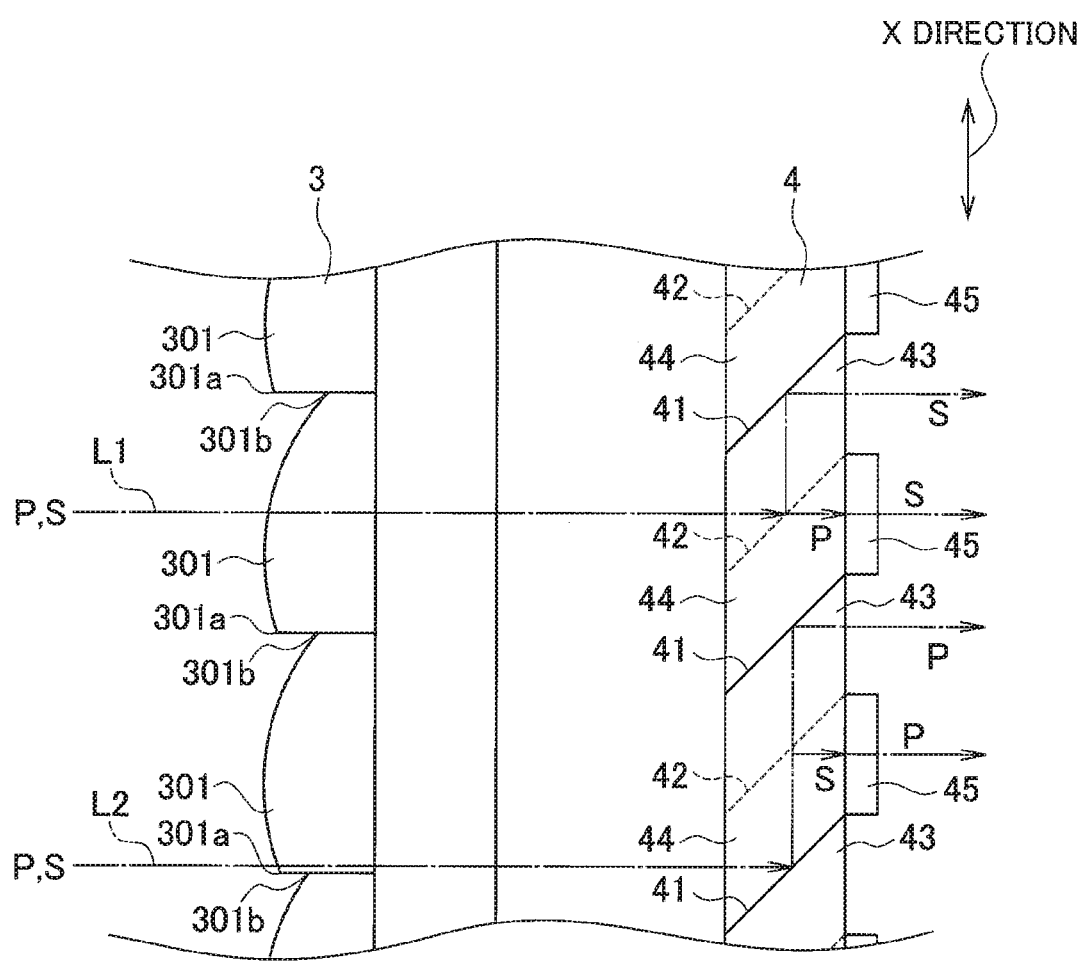
FIG. 5 is a view illustrating the action of the polarized light conversion element.

An action of the polarized light conversion element 4 will be described with reference to FIG. 5. In FIG. 5, partial luminous flux including the P-polarized light and the S-polarized light emitted from each lens cell 201 of the first fly-eye lens 2 is incident on each lens cell 301 of the second fly-eye lens 3. Among the light incident on the lens cells 301, central light L1 transmitted through a central portion of the lens cell 301 in the X direction and peripheral light L2 transmitted through a peripheral portion near the boundary are separately considered.

Which range of the lens cell 301 in the X direction is defined as the central portion and which range is defined as the peripheral portion can be a design matter.

As illustrated in FIG. 5, the P-polarized light out of the P-polarized light and the S-polarized light included in the central light L1 is transmitted through the polarized light separation surface 42 and is incident on the ½ wavelength plate 45. Since the ½ wavelength plate 45 converts the P-polarized light into the S-polarized light, the S-polarized light is emitted from the polarized light conversion region 44. The S-polarized light out of the P-polarized light and the S-polarized light included in the central light L1 is reflected by the polarized light separation surface 42 such that the traveling direction of the S-polarized light is bent by 90 degrees, after which the S-polarized light is further reflected by the reflection surface 41 and the traveling direction thereof is bent by 90 degrees, such that the S-polarized light is emitted from the non-polarized light conversion region 43.

The P-polarized light and the S-polarized light included in the peripheral light L2 are reflected by the reflection surface 41 such that the traveling directions of the P-polarized light and the S-polarized light are bent by 90 degrees, after which the P-polarized light and the S-polarized light are incident on the polarized light separation surface 42. The P-polarized light out of the P-polarized light and the S-polarized light which are incident on the polarized light separation surface 42 is transmitted through the polarized light separation surface 42 and then is incident on the other reflection surface 41. The other reflection surface 41 is the next reflection surface 41 on which the P-polarized light transmitted through the polarized light separation surface 42 is incident. The P-polarized light incident on the reflection surface 41 is reflected by the reflection surface 41 and the traveling direction thereof is bent by 90 degree, such that the P-polarized light is emitted from the non-polarized light conversion region 43.

The S-polarized light out of the P-polarized light and the S-polarized light incident on the polarized light separation surface 42 is reflected by the polarized light separation surface 42 such that the traveling direction of the S-polarized light is bent by 90 degrees, after which the S-polarized light is incident on the ½ wavelength plate 45. Since the ½ wavelength plate 45 converts the S-polarized light into the P-polarized light, the P-polarized light is emitted from the polarized light conversion region 44.

As described above, in the second fly-eye lens 3, the step difference exists at the boundary (first boundary) between two lens cells 301 adjacent to each other in the X direction, whereas the step difference does not exist at the boundary (second boundary) between two lens cells 301 adjacent to each other in the Y direction. Since only the boundary between the lens cells 301 adjacent to each other in the Y direction does not have the step difference, a change in the size of the illumination range by each lens cell 301 can be minimized.

Therefore, the size of the illumination range by each lens cell 301 is almost the same as the size of the illumination range in a shape having the step differences at the boundaries in the X direction and the Y direction, and the brightness of the light emitted from the respective lens cells 301 and superimposed on each other is unlikely to become uneven in the plane.

As described in FIG. 5, the polarized light conversion element 4 emits the P-polarized light based upon the peripheral light L2 transmitted through the peripheral portion near the boundary of the lens cell 301 in the X direction. However, the P-polarized light is not used as the illumination light, even though there is a shape error of "sagging" or "chipping" at the end portion of the lens cell 301, the quality of the image to be projected on the screen is not adversely affected.

As illustrated in FIG. 4, even though the boundary of the lens cell 301 in the Y direction is opposite to intersect the ½ wavelength plate 45, there is no step difference at the boundary of the lens cell 301 adjacent in the Y direction. Therefore, the peripheral light transmitted through the peripheral portion near the boundary of the lens cell 301 in the Y direction also does not adversely affect the quality of the image to be projected on the screen.

In one or more embodiments, the plurality of lens cells 301 are eccentric in both the X direction and Y direction such that the respective partial luminous fluxes emitted from the respective lens cells 301 are superimposed on each other. Therefore, the projection type image display device 100 does not require the condenser lens 5 for superimposing the respective partial luminous fluxes on the rear stage of the polarized light conversion element 4. The number of components can be reduced by a configuration in which the condenser lens 5 is omitted, and the brightness is not reduced by allowing the light to be transmitted through the condenser lens 5.

As described above, in accordance with the projection type image display device according to one or more embodiments, it is possible not only to minimize the change in the size of the illumination range by each lens cell of the fly-eye lens, but also to avoid the adverse effect on the image quality caused by the step difference existing at the boundary between the lens cells adjacent to each other.

The present invention is not limited to one or more embodiments described above, and various modifications can be made within a range not departing from the scope of the present invention. The projection type image display device of the present disclosure may be configured to include a pair of fly-eye lenses and a polarized light conversion element, and the configuration of the rear stage of the polarized light conversion element is not particularly limited.

What is claimed is:

1. A projection type image display device, comprising:
a first fly-eye lens configured to include a plurality of first lens cells arranged in a first direction and a second direction orthogonal to the first direction, and to divide an incident luminous flux into partial luminous fluxes for the respective first lens cells;
a second fly-eye lens configured to include a plurality of second lens cells arranged in the first direction and the second direction, and to individually condense the respective partial luminous fluxes emitted from the respective first lens cells by the respective second lens cells; and
a polarized light conversion element configured to emit a first polarized light used as illumination light, and to convert a second polarized light not used as the illumination light into the first polarized light to emit the converted first polarized light, out of the first polarized light and the second polarized light included in the light incident from the second fly-eye lens, wherein
in the polarized light conversion element, a reflection surface including a predetermined angle with respect to an incident surface of the light incident from the second fly-eye lens and reflecting the incident light and a polarized light separation surface including the predetermined angle, reflecting the first polarized light included in the incident light, and transmitting the second polarized light are alternately formed in the first direction at an interval of ½ of a size of the second lens cell in the first direction,
a region sandwiched between the reflection surface and the polarized light separation surface on a light emission surface of the polarized light conversion element is alternately formed with a polarized light conversion region to which a ½ wavelength plate is stuck and a non-polarized light conversion region to which the ½ wavelength plate is not stuck in the first direction,
the ½ wavelength plate is opposite to the plurality of the second lens cells arranged in the second direction,
the plurality of the second lens cells are respectively eccentric in the first and second directions,
the second lens cells arranged in the first direction have the same height, the second lens cells positioned on one side with respect to a first center in the first direction are eccentric to the other side with respect to the first center, in such a way that a degree of eccentricity of the second lens cell increases as the second lens cell goes from the first center toward an end portion of said one side with respect to the first center, and the second lens cells positioned on the other side with respect to the first center are eccentric to said one side with respect to the first center, in such a way that a degree of eccentricity of the second lens cell increases as the second lens cell goes from the first center toward an end portion of the other side,
heights of the second lens cells arranged in the second direction increase in order from an end portion in the second direction to a second center in the second direction, the second lens cells positioned on one side with respect to the second center are eccentric to the other side with respect to the second center, in such a way that a degree of eccentricity of the second lens cell increases as the second lens cell goes from the second center toward an end portion of said one side with respect to the second center, and the second lens cells positioned on the other side with respect to the second center are eccentric to said one side with respect to the second center, in such a way that a degree of eccentricity of the second lens cell increases as the second lens cell goes from the second center toward an end portion of the other side,
end portions of two second lens cells at a first boundary between the two second lens cells adjacent to each other in the first direction are deviated in the thickness direction of the second fly-eye lens, such that a step difference exists at the first boundary,
end portions of two second lens cells at a second boundary between the two second lens cells adjacent to each other in the second direction coincide with each other in the thickness direction of the second fly-eye lens, such that a step difference does not exist at the second boundary,
central light transmitted through a central portion of the second lens cell in the first direction is incident on the polarized light separation surface, and the polarized light separation surface reflects the first polarized light included in the central light and transmits the second polarized light,
the reflection surface on which the first polarized light reflected by the polarized light separation surface is incident reflects the first polarized light and causes the polarized light conversion element to emit the reflected first polarized light, and the ½ wavelength plate on which the second polarized light transmitted through the polarized light separation surface is incident converts the second polarized light into the first polarized light and causes the polarized light conversion element to emit the converted first polarized light,
peripheral light transmitted through a peripheral portion near the first boundary between the second lens cells is incident on the reflection surface and the reflection surface reflects the peripheral light, and the polarized light separation surface on which the peripheral light reflected by the reflection surface is incident reflects the first polarized light included in the peripheral light and transmits the second polarized light, and
the ½ wavelength plate on which the first polarized light reflected by the polarized light separation surface is incident converts the first polarized light into the second polarized light and causes the polarized light conversion element to emit the converted second polarized light, and the other reflection surface on which the second polarized light transmitted through the polarized light separation surface is incident reflects the second polarized light and causes the polarized light conversion element to emit the reflected second polarized light.

2. The projection type image display device according to claim 1, wherein
   the plurality of the second lens cells are respectively eccentric in the first and second directions such that the respective partial luminous fluxes emitted from the respective second lens cells are superimposed on each other.

\* \* \* \* \*